(12) United States Patent  
Kanno

(10) Patent No.: US 8,670,160 B2
(45) Date of Patent: Mar. 11, 2014

(54) PRINTING DEVICE FOR PRINTING CONCEAL PATTERN ON CHARACTER STRING PRINTED ON PRINTED OBJECT BASED ON SAID CHARACTER STRING, AND PRINTING METHOD AND RECORDING MEDIUM FOR THE SAME

(75) Inventor: Hiroki Kanno, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 248 days.

(21) Appl. No.: 13/187,301

(22) Filed: Jul. 20, 2011

(65) Prior Publication Data

US 2012/0019872 A1 Jan. 26, 2012

(30) Foreign Application Priority Data

Jul. 22, 2010 (JP) .................................. 2010-164782

(51) Int. Cl.
*G06K 15/02* (2006.01)
*B41K 1/42* (2006.01)
(52) U.S. Cl.
USPC ........................... 358/3.28; 358/401; 101/333
(58) Field of Classification Search
USPC .................................. 358/3.28, 401; 101/333
See application file for complete search history.

(56) References Cited

U.S. PATENT DOCUMENTS 5,666,191 A * 9/1997 Hasegawa et al. ............ 399/366
2009/0183645 A1* 7/2009 Yonetsu et al. ............... 101/333

FOREIGN PATENT DOCUMENTS

JP 2009-255515 A 11/2009
JP 2010-017881 A 1/2010

* cited by examiner

*Primary Examiner* — Gabriel I Garcia
*Assistant Examiner* — Andrew H Lam
(74) *Attorney, Agent, or Firm* — Holtz, Holtz, Goodman & Chick, PC

(57) ABSTRACT

The printing device includes a reading unit, a printing unit, an operation mode setting unit, a personal information determining unit that determines the kind of the personal information, such as an address, a personal name, or a telephone number, from image data read by the reading unit when the operation mode setting unit sets the operation mode to be a reading mode, a printing data setting unit, a concealing-pattern-data generating unit that generates concealing pattern data, and a printing control unit that activates the printing unit to perform printing on the printed object based on the concealing pattern data generated by the concealing-pattern-data generating unit when the operation mode setting unit sets the operation mode to be a printing mode.

15 Claims, 12 Drawing Sheets

FIG. 6

ADDRESS PICKED UP BY ZIP CODE SEARCHING

YAMAGATA PREF. YONEZAWA CITY, JYOSAI

YAMAGATA PREF. YONEZAWA CITY, RINSENJI

YAMAGATA PREF. YONEZAWA CITY, SASANO

...

RANDOM ADDRESS DATA GENERATED

YAMAGATA PREF. YONEZAWA CITY, JYOSAI 9-8-7

YAMAGATA PREF. YONEZAWA CITY, RINSENJI 1-2

YAMAGATA PREF. YONEZAWA CITY, SASANO 1234

...

RANDOM ADDRESS DATA GENERATED

YAMAGATA PREF. YONEZAWA CITY, JYOSAI 9-8-7 ABC CONDOMINIUM #302

YAMAGATA PREF. YONEZAWA CITY, RINSENJI 1-2 COOPERATIVE APARTMENT ABC #101

YAMAGATA PREF. YONEZAWA CITY, SASANO 1234 ELYSION YONEZAWA #803

...

LAST NAME

SATO    TAKAHASHI
SUZUKI  WATANABE
...

FIRST NAME

DAISUKE  SHOUTA
AI       AKINA
...

RANDOM DATA EXAMPLE

SATO DAISUKE
SUZUKI SHOUTA
TAKAHASHI AI
WATANABE AKINA
...

FIG. 11

CHARACTER STRING
PATTERN USED

TAKAHASHI EITA
YAMAMOTO REN
NAKAMURA KENTA
KOBAYASHI TORU
SUZUKI DAISUKE
SATOU MASARU
ITO YAMATO
KATO DAISUKE
WATANABE HINATO
TANAKA YUMA
YOSHIDA AKINA
YAMADA MIWA
YAMAGUCHI AOI
SAITOU SAKURA
SASAKI MISAKI
OSHIMA AI
HORI MAMI
NAITO HIROKO
IWAMOTO MEGUMI
HIRAI KAORI

GOTHIC → 57
MINCHO → 58
RANDOM → 59

PRINTING STRING

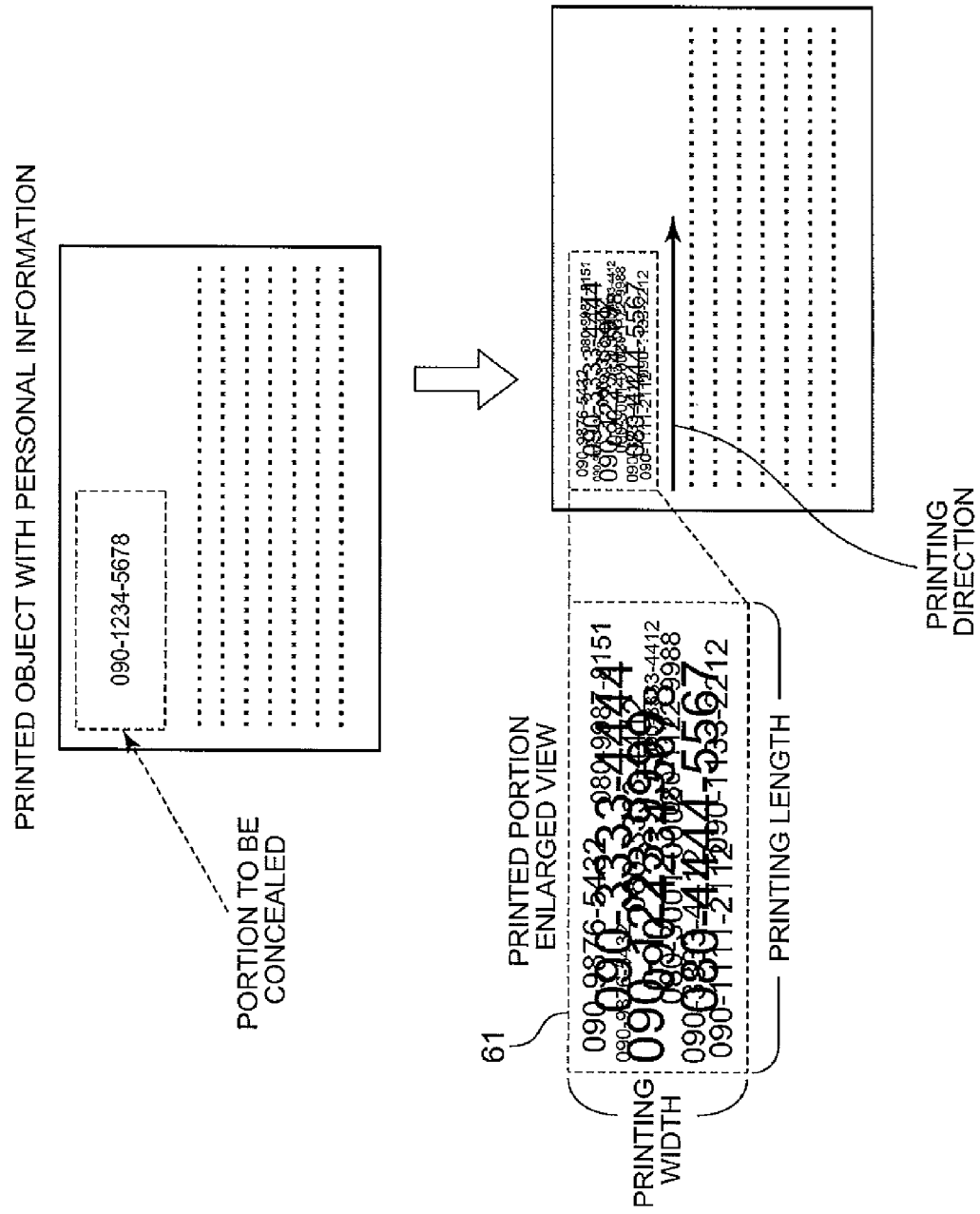

PRINTING DEVICE FOR PRINTING CONCEAL PATTERN ON CHARACTER STRING PRINTED ON PRINTED OBJECT BASED ON SAID CHARACTER STRING, AND PRINTING METHOD AND RECORDING MEDIUM FOR THE SAME

CROSS-REFERENCE TO RELATED APPLICATION

This application claims the benefit of Japanese Patent Application No. 2010-164782, filed on Jul. 22, 2010, the entire disclosure of which is incorporated by reference herein.

FIELD

This application relates generally to a printing device that performs printing on a printed object where character strings indicating personal information are printed in order to conceal the character strings on the printed object, a printing method that conceals printed character strings, and a computer-readable recording medium storing a printing control program that enables the printing device to conceal character strings.

BACKGROUND

Conventionally, when direct mails and billing statements including an address and a name are disposed, a leakage of personal information to the third person is suppressed by the use of a paper shredder or a security stamp. In particular, security stamps are inexpensive in comparison with paper shredders, and enable concealing of personal information by just stamping on the written portion of the personal information. Accordingly, security stamps are convenient for standard home having no paper shredder.

For example, Unexamined Japanese Patent Application KOKAI Publication No. 2009-255515 discloses a stamping device which puts and presses a stamping device main body against the personal information part of a printed object, thereby imprinting fixed alphabets, KANJI (Chinese characters), numbers, and symbols, etc., in order to conceal personal information. Moreover, Unexamined Japanese Patent Application KOKAI Publication No. 2010-17881 discloses a roller-type stamping device that imprints fixed characters, such as KANJI, HIRAGANA, and numbers often used for address by allowing a stamping device main body to be pushed against the personal information part of a printed object and moved so as to trace the personal information part, thereby concealing personal information.

According to Unexamined Japanese Patent Applications KOKAI Publications Nos. 2009-255515 and 2010-17881, however, respective stamping devices are for pressing a print face including predetermined alphabets, KANJI, numbers, and symbols, etc., and the contents of the print face are fixed, so that various character strings to be concealed and indicating personal information, such as an address, a name and a telephone number are concealed by stamping of the print face that is always same. Accordingly, the concealing effect is insufficient in some cases, and personal information may be read.

SUMMARY

The present invention has been made in view of the foregoing problem of the related art, and it is an object of the present invention to provide a printing device which can automatically identify the kind of personal information from character strings indicating the personal information to be concealed, and which can perform printing for concealing the personal information well, a printing method that performs printing for concealing the personal information well, and a computer-readable recording medium recording a printing control program that allows the printing device to perform printing for concealing the personal information well.

A first aspect of the present invention provides a printing device that performs printing on a printed object where a character string indicating personal information, such as an address, a personal name or a telephone number is printed in order to conceal the character string, and the printing device includes: a reading unit that reads the character string on the printed object and obtains image data when a device main body is moved; a printing unit that performs printing when the device main body is moved; an operation mode setting unit that sets an operation mode to either one of a reading mode that activates the reading unit when the device main body is moved or a printing mode that activates the printing unit when the device main body is moved; a personal-information determining unit that determines a kind of the personal information that is an address, a personal name, or a telephone number based on the image data read by the reading unit when the operation mode is set to be the reading mode by the operation mode setting unit; a printing data setting unit that inputs and sets, as character string data to be printed, a plurality of character strings belonging to a same kind of the personal information determined by the personal-information determining unit; a concealing-pattern-data generating unit that generates concealing pattern data including the plurality of character string data input and set by the printing data setting unit, the plurality of character string data being combined and arranged so as to overlap one another; and a printing control unit that causes the printing unit to perform printing based on the concealing pattern data generated by the concealing-pattern-data generating unit when the operation mode is set to be the printing mode by the operation mode setting unit in order to print a concealing pattern on the character string printed on the printed object.

A second aspect of the present invention provides a printing method of performing printing on a printed object where a character string indicating personal information, such as an address, a personal name or a telephone number, is printed in order to conceal the character string using a printing device that comprises a reading unit which reads the character string on the printed object and obtains image data when a device main body is moved in a reading mode, and a printing unit which performs printing when the device main body is moved in a printing mode, and the printing method includes: a personal-information determining step of determining a kind of the personal information that is an address, a personal name, or a telephone number based on the image data read by the reading unit in the reading mode; a printing data setting step of inputting and setting, as character string data to be printed, a plurality of character strings belonging to a same kind of the personal information determined through the personal-information determining step; a concealing-pattern-data generating step of generating concealing pattern data including the plurality of character string data input and set through the printing data setting step, the plurality of character string data being combined and arranged so as to overlap one another; and a printing step of causing the printing unit to perform printing based on the concealing pattern data generated through the concealing-pattern-data generating step when the device main body is moved over the printed object in the printing mode in order to print a concealing pattern on the character string printed on the printed object.

A third aspect of the present invention provides a computer-readable recording medium recording a printing control program for realizing a printing method of performing printing on a printed object where a character string indicating personal information, such as an address, a personal name or a telephone number, is printed in order to conceal the character string using a printing device that comprises a reading unit which reads the character string on the printed object and obtains image data when a device main body is moved in a reading mode, and a printing unit which performs printing when the device main body is moved in a printing mode, and the printing control program allows a computer to execute: a personal-information determining process of determining a kind of the personal information that is an address, a personal name, or a telephone number based on the image data read by the reading unit in the reading mode; a printing data setting process of inputting and setting, as character string data to be printed, a plurality of character strings belonging to a same kind of the personal information determined through the personal-information determining process; a concealing-pattern-data generating process of generating concealing pattern data including the plurality of character string data input and set through the printing data setting process, the plurality of character string data being combined and arranged so as to overlap one another; and a printing process of causing the printing unit to perform printing based on the concealing pattern data generated through the concealing-pattern-data generating process when the device main body is moved over the printed object in the printing mode in order to print a concealing pattern on the character string printed on the printed object.

The printing device of the present invention automatically determines the kind of the personal information on the printed object, generates concealing pattern data including a plurality of character string data corresponding to the determined kind of the personal information and combined and arranged so as to overlap one another, and prints the concealing pattern in order to conceal the character string that is the personal information. Accordingly, the character string that is the personal information can be concealed by the concealing pattern in accordance with various character strings that are the personal information to be concealed, and printing for concealing with a good concealing ability is enabled. In particular, the concealing effect of the personal information can be enhanced by generating the concealing pattern in accordance with the kind of the personal information, such as an address, a personal name, or a telephone number.

BRIEF DESCRIPTION OF THE DRAWINGS

A more complete understanding of this application can be obtained when the following detailed description is considered in conjunction with the following drawings, in which:

FIG. 6 is an explanatory diagram relating to address data generated in order to conceal an address included in personal information by the scanning type printing device;

FIG. 11 is an explanatory diagram relating to concealing pattern data generated in order to conceal a name included in personal information by the scanning type printing device;

FIG. 12 is an explanatory diagram showing operations by the scanning type printing device up to an operation of concealing a telephone number included in personal information.

DETAILED DESCRIPTION

Figure 1:
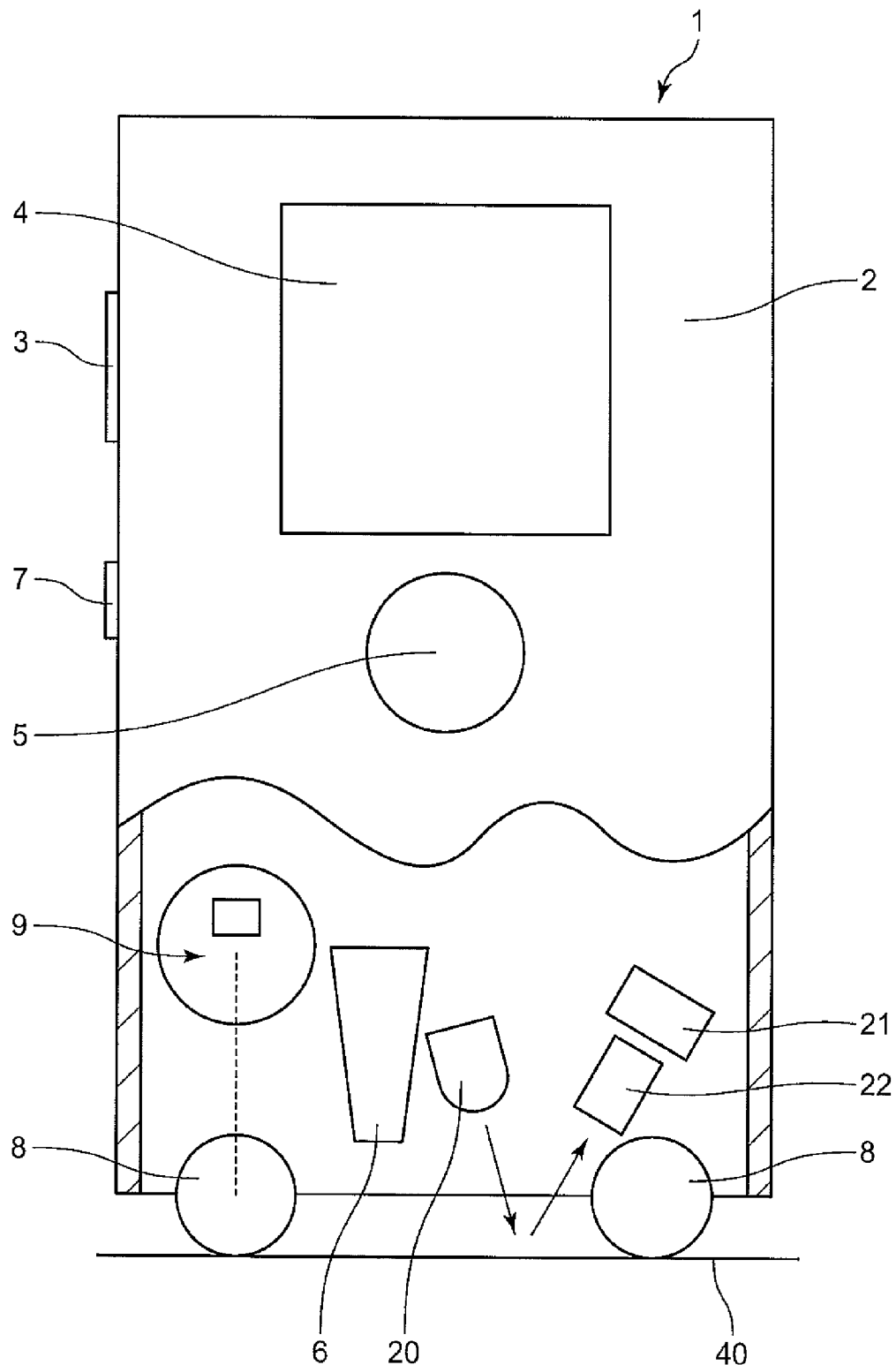
FIG. 1 is an exemplary diagram showing a side cross-section of a scanning type printing device according to an embodiment of the present invention.

An explanation will be given of an embodiment of the present invention with reference to the accompanying drawings. The explanation will be given of a case in which a printing device is a scanning type printing device 1 like a handy printer with a scanner. FIG. 1 is an exemplary diagram showing a side cross-section of the scanning type printing device 1 according to an embodiment of the present invention.

As shown in FIG. 1, the scanning type printing device 1 prints characters and patterns, etc., on a printed object 40 or a piece of paper by allowing the printing device to be moved while being pressed against the printed object 40 like paper. Moreover, the scanning type printing device 1 includes a reading unit that reads an image on the printed object 40 when the device main body is moved on the printed object 40 while turning rollers 8. The scanning type printing device 1 has a hollow-rectangular casing 2 that is in a holdable size. A touch panel 4 that is configured by stacking a touch sensor surface on a liquid crystal display surface is formed on the upper part of the casing 2.

The touch panel 4 displays all of or some of images like characters and patterns, etc., relating to input data, a selection menu for various settings, and messages relating to various processes. The touch panel 4 enables various settings, inputting of character data, and selection inputting for selecting printing data from printing candidates displayed using a finger or a touch pen.

Provided at a side of the casing 2 are switches, such as an operation switch 5 that is a key inputting unit for executing printing, a power switch 3, and an operation-mode change switch 7. The operation-mode change switch 7 is an operation-mode setting unit that sets an operation mode to either one of a reading mode of executing a reading operation when the device main body is moved on the printed object 40 and a printing mode of activating a printing unit.

An opening is formed in the bottom face of the casing 2 at a position corresponding to an ink-jet head 6, and the rollers 8 that are caused to contact the printed object 40 are provided near both ends of the bottom of the casing 2.

Moreover, provided inside the bottom of the casing 2 are the ink-jet head 6, a one-dimensional image sensor 21 which is a reading unit, an LED array 20 and a lens 22. The ink-jet head 6 is the printing unit, arranged so as to correspond to the opening of the bottom face of the casing 2, and ejects inks from the nozzles of the ink-jet head 6 on the printed object 40 in the vertical direction when the rollers 8 of the casing 2 are caused to contact a face of the printed object 40 placed on a plane stage, etc., thereby performing printing.

The LED array 20 lights up the printed object 40 subjected to reading. The one-dimensional image sensor 21 includes, for example, a line CCD with a reading width of 24 mm and a resolution of 8 dots/mm, and reads an image on the printed object 40 lighted up by the LED array 20 through the lens 22.

A rotary encoder 9 is arranged inside the casing 2, and a rotation of the roller 8 is linked with a rotating mechanism of the rotary encoder 9 which is a slit disk through a non-illustrated gear sequence. Accordingly, when the roller 8 is placed on the printed object 40 and the device main body is moved, a pulse signal in accordance with the rotation of the roller 8 is generated by the rotary encoder 9, is transmitted to a control unit to be discussed later, and the control unit drives the one-dimensional image sensor 21 or the ink-jet head 6 using the pulse signal as a timing signal, thereby executing a reading or printing operation. That is, the rotary encoder 9 serves as a travel distance detecting unit that detects a travel distance when the device main body is moved. Furthermore, it is not illustrated in the figure but the casing 2 is provided with an input terminal to be connected to an external device like a personal computer, a slot where a memory medium like a memory card is inserted, and the like.

Figure 2:
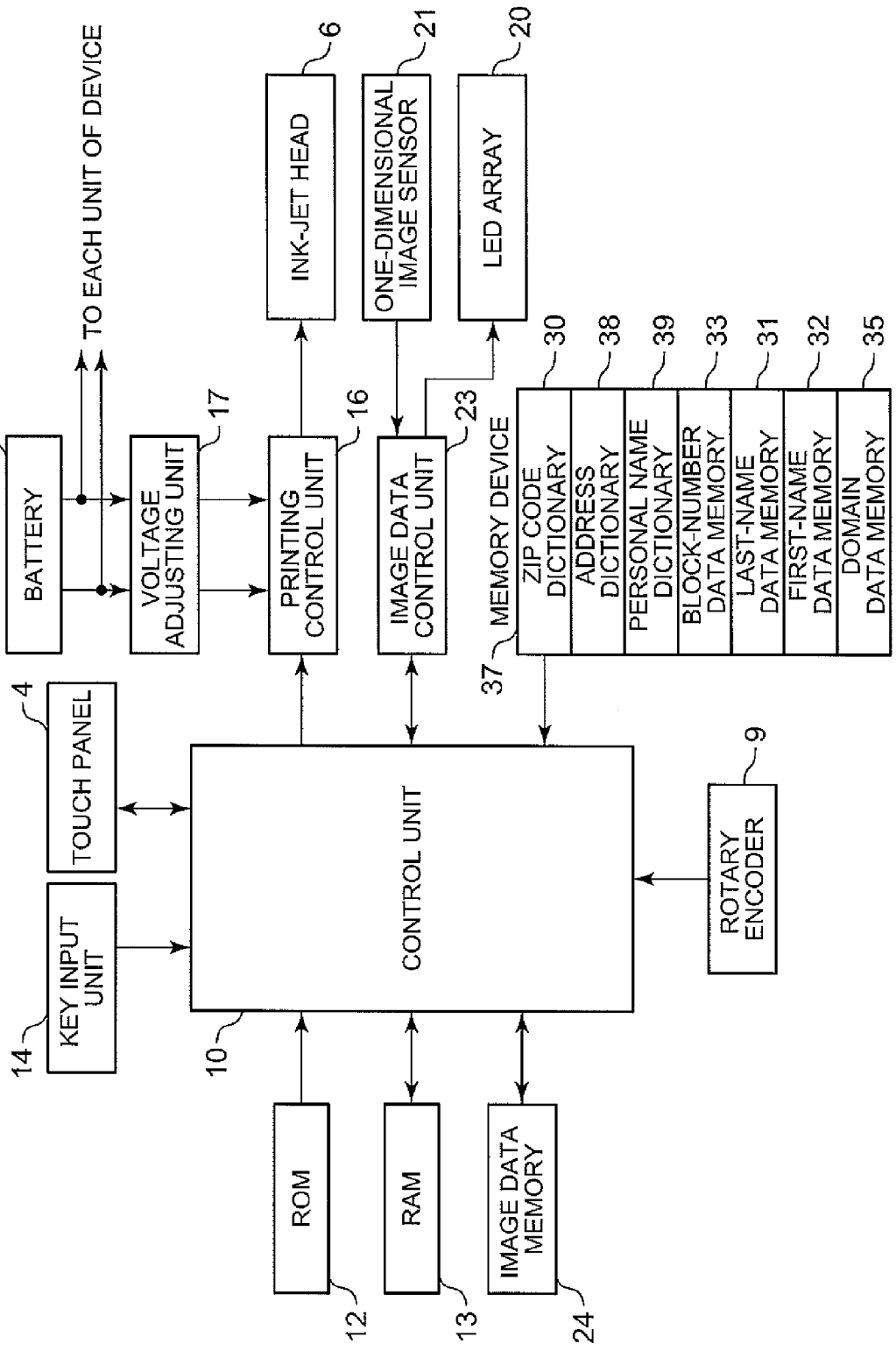
FIG. 2 is a circuit block diagram showing the circuit configuration of the scanning type printing device according to the embodiment of the present invention.

FIG. 2 is a circuit block diagram showing the circuit configuration of the scanning type printing device 1. As shown in FIG. 2, the scanning type printing device 1 includes a control unit 10, a ROM 12, a RAM 13, a memory device 37, the touch panel 4, the ink-jet head 6, the rotary encoder 9, a key input unit 14, a printing control unit 16, a voltage adjusting unit 17, the LED array 20, the one-dimensional image sensor 21, an image data control unit 23, an image data memory 24 and a battery 18.

The scanning type printing device 1 is also a printing device that performs printing on the printed object 40 in order to conceal personal information on the printed object 40 where character strings indicating the personal information like an address, a name or a telephone number are printed. That is, the scanning type printing device 1 has a function as a security stamp of concealing the personal information on the printed object 40.

The control unit 10 is a micro computer like a CPU, launches a system program stored in the ROM 12 beforehand, a control program stored in the memory medium like a memory card, a control program read from the external device, and a control program read from a Web server over an external communication network, and controls the operation of each circuit using the RAM 13 as a work memory.

In order to make the function as the security stamp activated, the control unit 10 controls the image data control unit 23, reads image through the one-dimensional image sensor 21 that is a reading unit for automatically identifying character strings on the printed object 40 where the character strings indicating personal information, such as an address, a name, a telephone number or an e-mail address are printed, and obtains character information of the image data through an OCR (Optical Character Reader) technique.

The image data control unit 23 activates the LED array 20 at the time of reading of an image, and by receiving a pulse signal output by the rotary encoder 9 and received through the control unit 23 when the scanning type printing device 1 is moved (subjected to scanning) by a predetermined distance, reads an output by the one-dimensional image sensor 21 by what corresponds to a line, and supplies the read output as image data to the control unit 10. The control unit 10 stores the supplied image data in the image data memory 24.

The control unit 10 serves as a personal information determining unit that obtains character information from the image data stored in the image data memory 24 through the OCR technique, and determines the kind of personal information, such as an address, a name, a telephone number or an e-mail address. When detecting a district name, a street name, a block symbol, a lot number, and a condominium or apartment name from the character information, the control unit 10 determines that the detected character string is an address. Moreover, when detecting a KANJI (or ALPHABET SPELLING) used for a name by checking the KANJI (or ALPHABET SPELLING) detected from the character information with a personal name dictionary 39, the control unit 10 determines that the character information is a personal name. Furthermore, it is fine if the control unit 10 determines that the character information is a personal name when detecting a space between characters expected as a first name and a last name regarding characters obtained from the detected character information.

When detecting only numbers from the character information, a character string including a number, a hyphen, or brackets surrounding numbers, and a word "TEL" before the numbers, the control unit 10 determines that the detected character string is a telephone number. Moreover, when detecting a character string including only alphabet, number, and symbol from the detected character information, or an at-mark character in the character string, the control unit 10 determines that the detected character string is an e-mail address.

Next, the control unit 10 functions as a print data setting unit that sets a plurality of character strings belonging to the same kind as that of the determined personal information as character string data to be printed.

Furthermore, in order to conceal the character strings on the printed object 40 where character strings indicating the personal information, such as an address, a personal name, a telephone number or an e-mail address are printed, the control unit 10 functions as a concealing-pattern-data generating unit that generates concealing pattern data having the plurality of character string data set by the print data setting unit arranged at random or superimposed and combined so as to change respective positions in a regular way like being shifted periodically.

When determining as the personal information determining unit that the detected character string is an address that is the kind of the personal information, in order to function as the print data setting unit that sets character string data to be printed that includes a plurality of character strings belonging to the same kind as that of the personal information, the control unit 10 functions as a data reading unit that extracts a zip code from the detected address data, changes the numbers of some of or all of the digits of the zip code data in order to generate a plurality of zip code data actually present, and reads a plurality of address data that is character string data from a zip code dictionary 30 to be discussed later.

The control unit 10 has three kinds of change levels that are "town and village", "city and district", and "state (prefecture)" for changing the numbers of at least some digits of the zip code data determined by the data reading unit. The control unit 10 causes a user to set the change level of the zip code data beforehand.

When the set change level is "town and village" that changes the number of lower four digits of the zip code data, the control unit 10 generates concealing pattern data that is a so-called neighboring address data which has the same "state, city and district" as those of the address in the personal information to be concealed but has "town and village" changed therefrom.

Moreover, when the set change level is "city and district" that changes the number of lower five digits of the zip code data, the control unit 10 generates concealing pattern data which has the same "state" as that of the address in the personal information to be concealed but has "city and district" changed therefrom.

Furthermore, when the set change level is "state" that changes the number of all digits of the zip code data, the control unit 10 extracts address data of all regions in Japan at random, and generates concealing pattern data.

When determining that the detected character string is a personal name that is a kind of the personal data by the personal information determining unit, the control unit 10 serves as a personal-name-data generating unit which reads a plurality of last-name data and a plurality of first-name data from a last-name data memory 31 that is a last-name data memory unit storing a plurality of last-name data to be discussed later and a first-name data memory 32 that is a first-name data memory unit storing a plurality of first-name data to be discussed later, respectively, combines the last-name data and the first-name data and generates a plurality of personal-name data as the character string data by the print data setting unit.

When determining that the detected character string is a telephone number that is a kind of the personal information determined by the personal information determining unit, the control unit 10 serves as a telephone-number-data generating unit that generates, as the character data by the print data setting unit, a plurality of telephone-number data including a number string that is a combination of arbitrary numbers with predetermined digits and has a hyphen or blackest surrounding numbers at predetermined positions.

The ROM 12 is a memory unit that stores a program for printing a character string selected and input through the touch panel 4, printing fonts, display fonts, symbols, and patterns, and also serves as a memory medium that stores the printing control program readable by the CPU.

The RAM 13 is a temporal memory unit that executes a process of storing editing information including character string data like characters, a text, etc., input through the key input unit 14 and the touch panel 4, and a process of storing various setting menus displayed on the touch panel 4.

The memory device 37 is a memory readable by the CPU, such as a magnetic, magneto-optical, or semiconductor memory medium. The memory device 37 includes a transportable medium like a memory card and a fixed medium like a hard disk.

As shown in FIG. 2, the memory device 37 includes the zip code dictionary 30, the address dictionary 38, the personal-name dictionary 39, a block-number data memory 33 that stores block-number data, the last-name data memory 31 that stores last-name data, the first-name data memory 32 that stores first-name data, and a domain data memory 35 that stores domain data.

The zip code dictionary 30 is a latest dictionary that stores zip code data of seven digits in association with address data including a state name, a city and district name, and a town and village name for each region all over Japan.

The address dictionary 38 stores address data of state (prefecture and city government), city, district, town, and village, etc., and when a specific place name is set, the address dictionary 38 is used for extracting address candidates using that place name all over Japan. For example, regarding a place name "Ibaraki prefecture, Tsukuba city, and Takura", when KANJI (or ALPHABET SPELLING) corresponding to the "Takura" part is recognizable, address candidates are detected, such as "Yamaguchi prefecture, Shimonoseki city, Takura Goten town", and "Chiba prefecture, Futtu city, and Takura". The address dictionary 38 is used for specifying an address in the character information included in the image data read by the one-dimensional image sensor 21.

The personal-name dictionary 39 stores personal-name KANJI (or personal-name ALPHABET SPELLING) which can be used for a personal name including KANJI listed on the common-use KANJI table. The personal-name dictionary 39 is used for determining whether or not characters detected from the character information included in the image data read by the one-dimensional image sensor 21 configure personal-name KANJI (or personal-name ALPHABET SPELLING), thereby determining whether or not the detected characters configure a personal name.

The block-number data memory 33 stores, as additional character string data for generating address data like a block number, a building name, an apartment name, a floor number, and a room number, a plurality of block-number information, such as "9-8-7", and "block number 1234", and a plurality of fictional condominium or apartment information, such as "ABC condominium, room #302", and "cooperative apartment ABC, room #101". The room number of an apartment or condominium may be set at random.

When determining as the personal-information determining unit that the kind of the personal information is an address, the control unit 10 functioning as the data reading unit extracts zip code data from the address data obtained through character recognition, and generates a plurality of zip code data actually present by changing at least some numbers of the extracted zip code data, and reads a plurality of address data from the zip code dictionary 30. Next, the control unit 10 combines the plurality of read address data with the foregoing additional character string data in order to generate a plurality of address data that are character string data, and serves as the concealing-pattern-data generating unit that generates concealing pattern data.

The last-name data memory 31 stores a plurality of character string data that are last-name data, such as "SATO", and "TAKAHASHI", beforehand in order to conceal a personal name on the printed object 40 where a personal name as personal information is described. The first-name data memory 32 stores a plurality of character string data that are first-name data, such as "DAISUKE", and "SHOUTA", beforehand in order to conceal a personal name on the printed object 40 where a personal name as personal information is described.

When determining as the personal-information determining unit that the kind of the personal information is a personal name, the control unit 10 functioning as the personal-name-data generating unit reads a plurality of last-name data and a plurality of first-name data from the last-name data memory 31 that is the last-name data memory unit storing a plurality of last-name data and the first-name data memory 32 that is the first-name data memory unit storing a plurality of first-name data, respectively, combines the last-name data with the first-name data, generates a plurality of personal name data that are the character string data, and functions as the concealing-pattern-data generating unit that generates concealing pattern data.

The domain data memory 35 stores a plurality of character string data that are domain data like "docomo.ne.jp" and "ezweb.ne.jp" actually present in order to conceal an e-mail address on the printed object 40 where an e-mail address as the personal information is described.

When determining that the kind of the personal information is an e-mail address, the control unit 10 functions as an e-mail address generating unit that synthesizes an at mark with an arbitrary combination of characters, and further combines such synthesized data with the plurality of character string data that are domain data like "docomo.ne.jp" and "ezweb.ne.jp" stored in the domain data memory 35 in order to generate e-mail address data which is character string data, and functions as the concealing-pattern-data generating unit that generates concealing pattern data.

The image data memory 24 includes an area storing image data read by the one-dimensional image sensor 21 and a work area for detecting character information from the image data.

Under the control of the control unit 10, the printing control unit 16 controls, when the power switch 3 that is the key input unit 14 is pressed and the device main body is activated, and the user moves the device main body on the printed object 40 while holding the operation switch 5 which triggers printing, the ink-jet head 6 that serves as a printing unit printing the concealing pattern data generated by the concealing-pattern-data generating unit.

The rotary encoder 9 is an incremental type encoder, and includes a rotating plate having a slit sequence rotated when the roller 8 rotates, and two pairs of light emitting devices and photo receiving devices arranged so as to put the rotating plate therebetween. The rotary encoder 9 transmits, to the control unit 10, a pulse signal for detecting the travel distance of the scanning type printing device 1 by causing the photo receiving devices to receive light emitted from the light emitting devices and passing through the slits when the rotating plate rotates.

The control unit 10 controls the printing control unit 16 based on the pulse signal that is a travel distance detecting signal from the rotary encoder 9, i.e., the travel distance of the scanning type printing device 1, and drives and controls the ink-jet head 6 serving as the printing unit that ejects inks from the nozzle sequence arranged in the scanning direction for each operation per a line. Moreover, the control unit 10 counts the inputting of the pulse signals in order to calculate the travel distance of the device main body, and determines whether or not the printing has completed.

The battery 18 supplies a voltage to respective units in the device. The voltage adjusting unit 17 monitors the remaining voltage level of the battery 18, monitors the voltage level so that the device main body can perform printing appropriately, and generates a warning when the voltage level becomes lower than a predetermined voltage level in order to prompt the user to charge the battery 18 or replace it.

Figure 3:
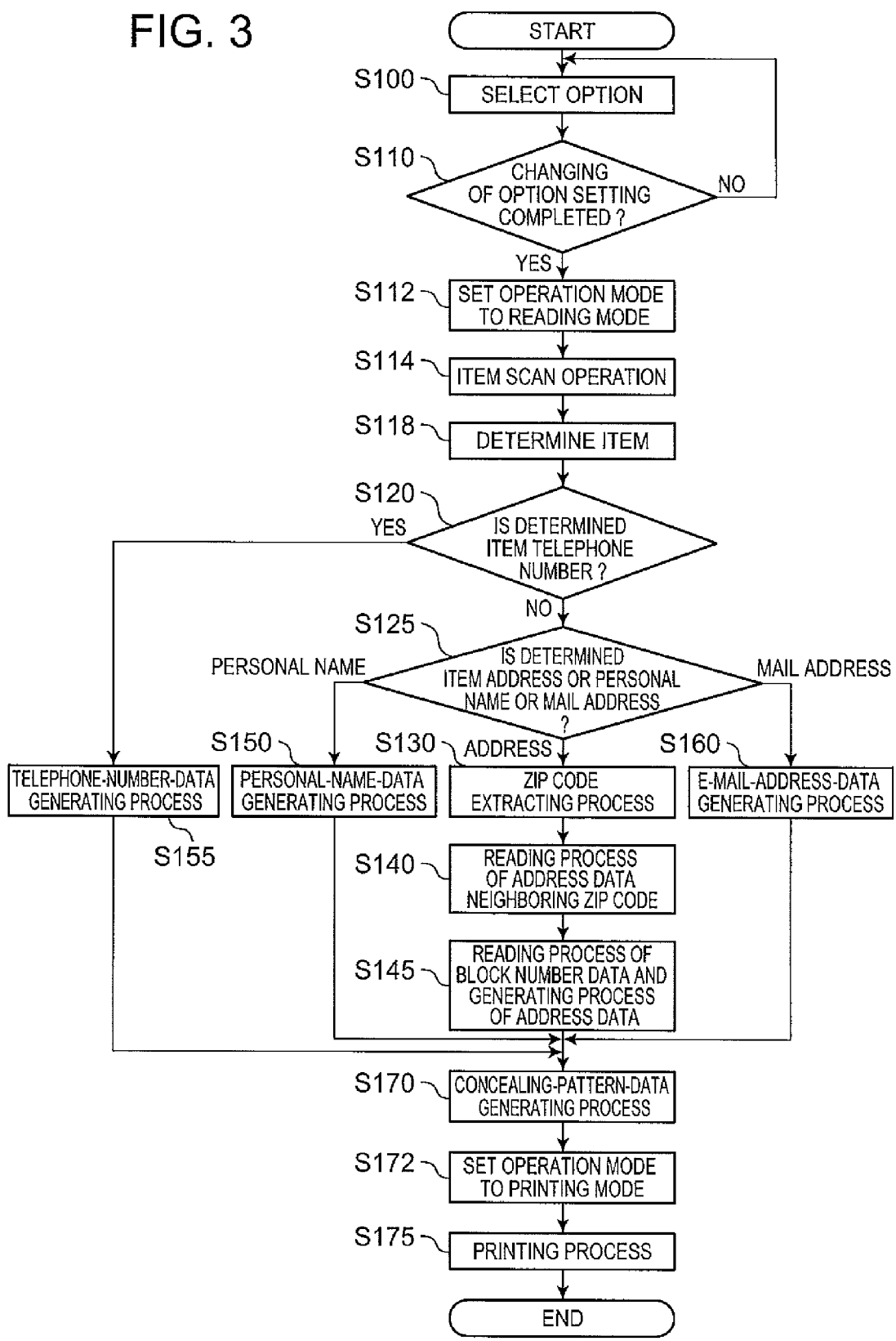
FIG. 3 is a flowchart showing a printing method of a security stamp by the scanning type printing device according to the embodiment of the present invention.

Next, an explanation will be given of specific flows of the printing method of a security stamp by the scanning type printing device 1 according to the present embodiment of the present invention with reference to the flowchart of FIG. 3. FIGS. 4 to 12 show respective specific examples of the processes in order to explain the specific flows of the printing method.

When the power is turned on and the user selects a setting menu of a security stamp, the control unit 10 executes an option setting process (step S100).

As the option setting process (step S100), the control unit 10 displays, on the touch panel 4, a setting menu for any one of a character font kind, a character style, a concentration or a font size which are option settings of a security stamp. Hence, the user sets various options successively.

For example, when the character font kind is set, the user is caused to select any one of a MINCHO font, a Gothic font, a brush-style elegant font, a brush-style standard font, or random. Moreover, when the character style is set, the user is caused to select any one of standard, a thick character, a whitened character, a shadowed character, a stereoscopic character, or random.

When the concentration is set, the concentration range from "thin" to "thick" is divided into five levels, and the user is caused to select the concentration level. Moreover, when the font size is set, the user is caused to select an arbitrary font size which is from 8 points (⅑ inch) to 36 points (½ inch) for example. Those settings have default values, respectively.

The control unit 10 monitors whether or not various settings of the security stamp have completed in order to execute a setting-change completion determining process (step S110). As the stetting-change completion determining process (step S110), when changing of the various option settings of the security stamp by the user completes or when a default value is selected for each setting, the control unit 10 executes a reading mode setting process (step S112) in order to shift the operation mode to the reading mode.

As the reading mode setting process (step S112), the control unit 10 displays, for example, a message like "set reading mode and start scanning to portion to be concealed" on the touch panel 4.

When the user operates the operation mode changing switch 7 to set the reading mode and pushes and moves the device main body over the printed object 40 while holding the operation switch 5, the control unit 10 controls the image-data control unit 23 to turn on the LED array 20, thereby lighting up the printed object 40 subjected to reading. Next, the control unit 10 controls the image-data control unit 23 to drive the one-dimensional image sensor 21, and in order to determine an item that is a kind of the personal information on the printed object 40 lighted up by the LED array 20, executes an item scanning process (step S114) of reading the personal information on the printed object 40 through the lens 22 and storing the image data in the image data memory 24.

As the item scanning process (step S114), the control unit 10 functioning as the personal-information determining unit first analyzes, through the OCR technique, character information, a printing width and a printing length indicating the range of the character information, and a printing direction indicating whether the character information is in the vertical direction or in the horizontal direction from the image data stored in the image data memory 24, and executes an item determining process (step S118) of determining at first whether an item is an address, a personal name, a telephone number or an e-mail address from the character information. The control unit 10 stores the item determined through the item determining process (step S118) which is the kind of the personal information in the work area of the RAM 13.

Next, the control unit 10 executes a telephone-number determining process (step S120) of determining whether or not the determined item is a telephone number in order to generate concealing pattern data in accordance with the item. When the item that is the kind of the personal information stored in the RAM 13 is a "telephone number", the process progresses to a telephone-number-data generating process (step S155) of generating a plurality of telephone number data for concealing the telephone number that is the personal information, and when the item is other than the "telephone number", the process progresses to a next item-kind determining process (step S125).

In the item-kind determining process (step S125), when the item that is the kind of the personal information stored in the RAM 13 is an "address", the control unit 10 executes a zip-code extracting process (step S130) of checking the address data based on the character information read from the image data with the zip code dictionary 30, and of obtaining zip code data.

Moreover, in the item-kind determining process (step S125), when the kind of the personal information stored in the RAM 13 is a "personal name", the control unit 10 executes a personal-name-data generating process (step S150) of generating a plurality of personal name data that are character string data for concealing the personal name that is the personal information.

Furthermore, in the item-kind determining process (step S125), when the kind of the personal information stored in the RAM 13 is an "e-mail address", the control unit 10 executes an e-mail-address-data generating process (step S160) of generating a plurality of e-mail address data for concealing the e-mail address that is the personal information.

Figure 4:
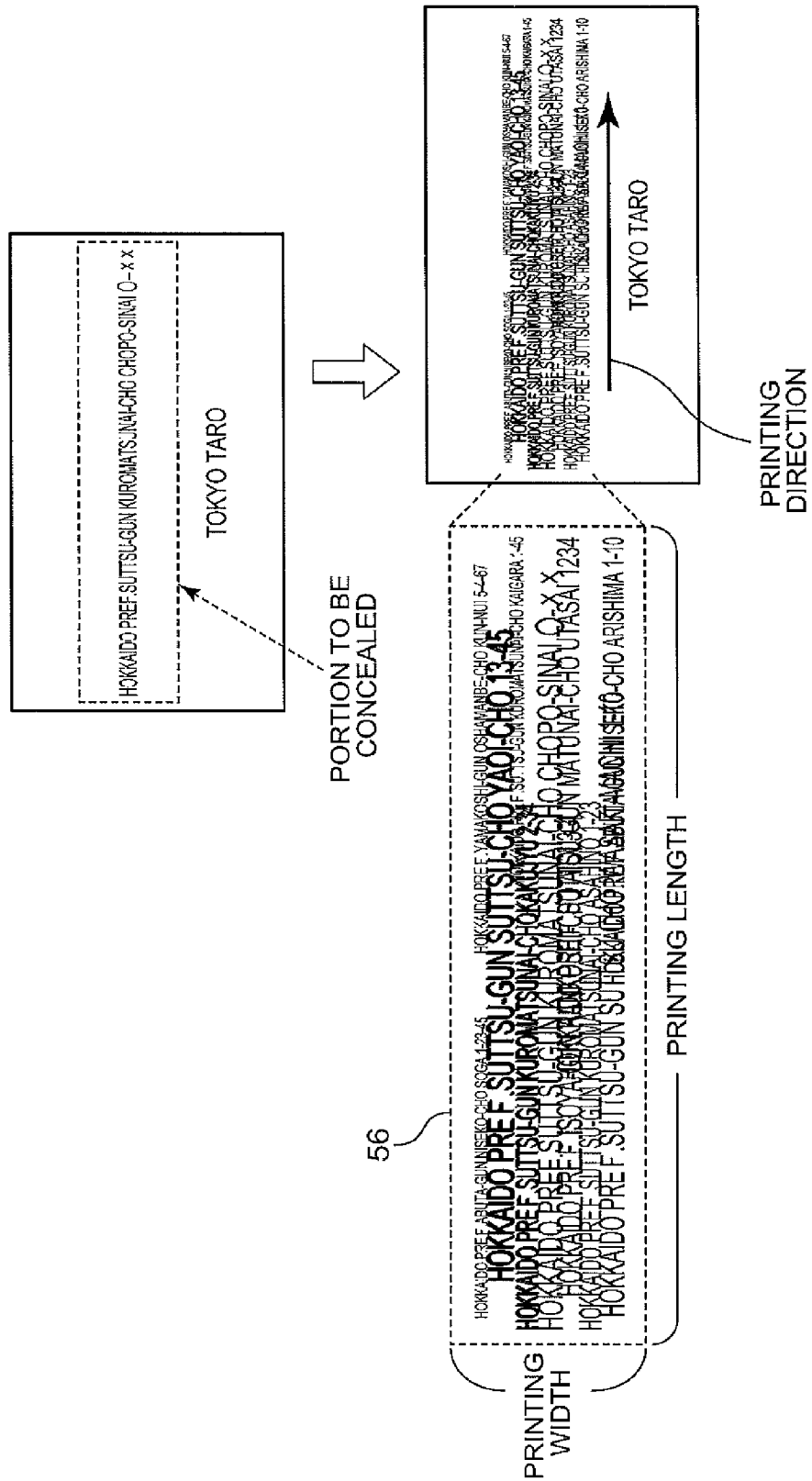
FIG. 4 is an explanatory diagram showing operations by the scanning type printing device up to a concealing operation of an address included in personal information.

When checking the address data obtained from the character information with the zip code dictionary 30 and obtaining zip code data through the zip-code extracting process (step S130), the control unit 10 checks the setting whether or not to add apartment-condominium information set beforehand and the setting for the change level (the state level, the city and district level, and the town and village level) of the zip code data. An explanation will now be given of a case in which the control unit 10 determines that the kind of the personal information is the "address" and of an operation up to concealing of the address that is the personal information. FIG. 4 is an explanatory diagram of operations up to a concealing operation of the address included in the personal information.

As shown in FIG. 4, the control unit 10 determines that the kind of the personal information is the "address" and extracts zip code data "0480132" from address data that is character data "Hokkaido, Suttsu-gun, Kuromatsunai-cho, Chopo-sinai". Next, the control unit 10 generates concealing patterns 56 that are address data actually present like "Hokkaido, Yamakoshi-gun, Oshamanbe-cho, Kun-nui", and "Hokkaido, Suttsu-gun, Suttsu-cho, yaoi-machi" having different "city and district" (in this case, gun and cho) by changing the numbers of lower five digits of the zip code data. The concealing patterns 56 are generated with a printing width and a printing length extracted from the character information read in the reading mode beforehand.

Figure 5:
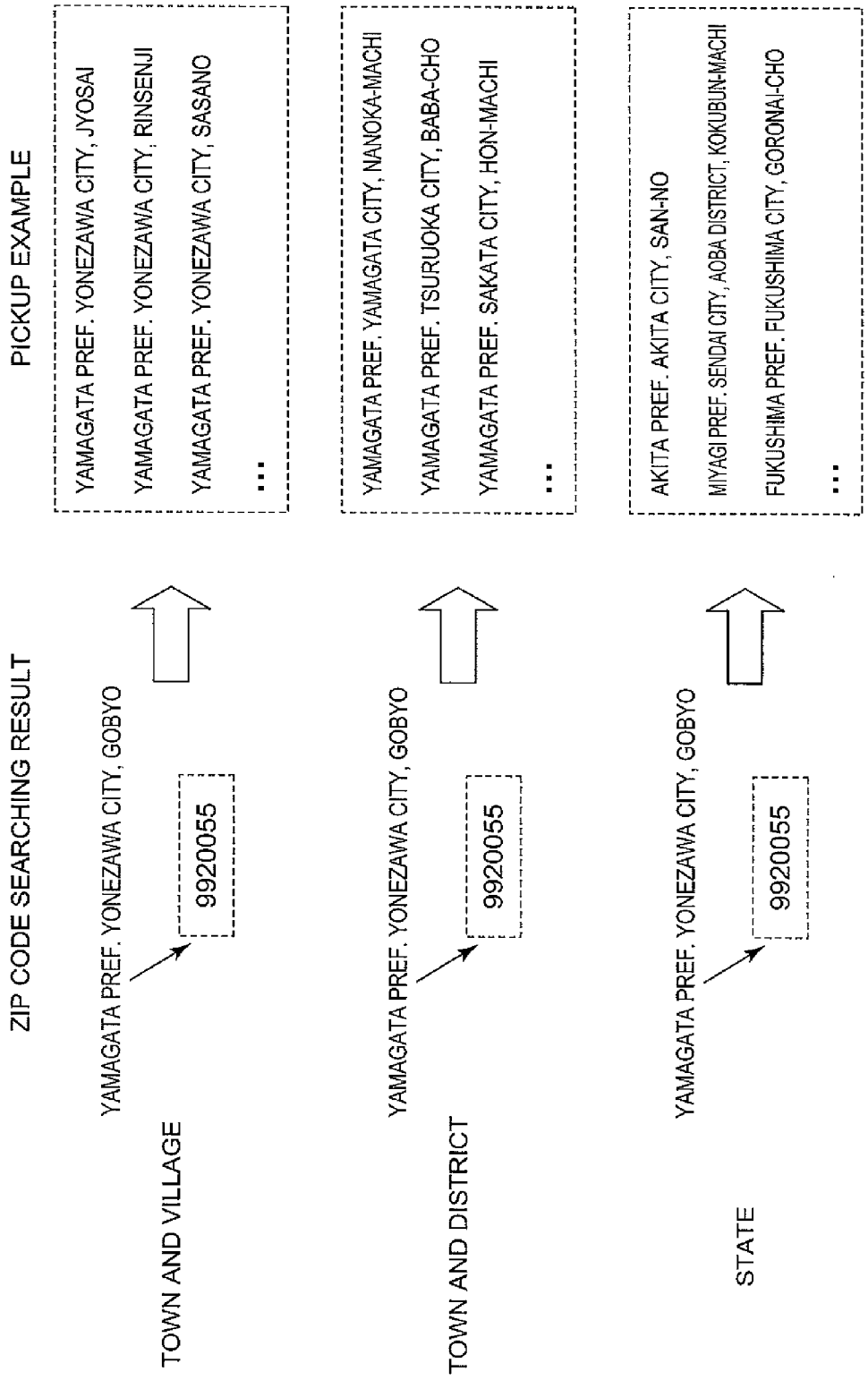
FIG. 5 is an explanatory diagram relating to an extraction of similar address data for concealing an address included in personal information by the scanning type printing device.

That is, when confirming the obtained zip code data, the setting of the apartment-condominium information, and the setting of the change level, the control unit 10 functions as the data reading unit that executes a data reading process (step S140) of executing a process based on the determined zip code data and the setting of the change level, of generating, for example, seven pieces of zip code data actually present, and of reading address data corresponding to the generated zip code data from the zip code dictionary 30. FIG. 5 shows an explanatory diagram relating to an extraction of similar address data for concealing the address included in the personal information.

As shown in FIG. 5, the control unit 10 obtains "9920055" that is zip code data indicating the region of "Yamagata prefecture, Yonezawa city, Gobyo", and when the change level setting is a town and village level indicating the neighborhood, the lower four digits of the zip code data are changed, thereby generating zip code data actually present like "9920054", "9920062", and "9921443" stored in the zip code dictionary 30. The control unit 10 functioning as the data reading unit reads address data "Yamagata prefecture, Yonezawa city, Jyo-sai", "Yamagata prefecture, Yonezawa city, Rinsen-ji", and "Yamagata prefecture, Yonezawa city, Sasano" corresponding to "9920054", "9920062", and "9921443", respectively, from the zip code dictionary 30.

Likewise, the control unit 10 obtains "9920055" that is zip code data indicating the region of "Yamagata prefecture, Yonezawa city, Gobyo", and when the change level setting is a city and district level indicating different city and district in the same prefecture, the lower five digits of the zip code data are changed in order to generate zip code data actually present like "9900042", "9970035", and "9996835" stored in the zip code dictionary 30. Next, the control unit 10 functioning as the data reading unit reads address data "Yamagata prefecture, Yamagata city, Nanoka-machi", "Yamagata prefecture, Tsuru-oka city, Baba-cho", and "Yamagata prefecture, Sakata city, Hon-machi" corresponding to "9900042", "9970035", and "9996835" from the zip code dictionary 30.

Furthermore, the control unit 10 obtains "9920055" that is zip code data indicating the region of "Yamagata prefecture, Yonezawa city, Gobyo", and when the change level setting is a state level, the upper two (or whole) digits of the zip code data are changed in order to generate zip code data actually present like "0100951", "9800803", and "9608111" stored in the zip code dictionary 30. Next, the control unit 10 functioning as data reading unit reads address data "Akita prefecture, Akita city, San-no", "Miyagi prefecture, Sendai city, Aoba district, Kokubun-machi", and "Fukushima prefecture, Fukushima city, Goro-nai cho" corresponding to "0100951", "9800803", and "9608111" from the zip code dictionary 30.

Next, the control unit 10 executes an address data generating step (step S145) of extracting seven pieces of address data generated through the data reading process (step S140) and seven pieces of random additional character string data like a block number, a building name, an apartment name, a floor number, and a room number in the block-number data memory 33, and of combining those pieces of data in order to generate seven pieces of address data in the printing data setting process. Accordingly, seven pieces of address data for concealing an address that is the personal information are generated. FIG. 6 shows an explanatory diagram relating to address data generated in order to conceal the address included in the personal information.

As shown in FIG. 6, the control unit 10 generates address data like "Yamagata prefecture, Yonezawa city, Jyo-sai, 9-8-7", and "Yamagata prefecture, Yonezawa city, Jyo-sai, 9-8-7, ABC condominium #302" by combining address data generated with the change level setting being a town and village level indicating the neighborhood and actually present like "Yamagata prefecture, Yonezawa city, Jyo-sai", "Yamagata prefecture, Yonezawa city, Rinsen-ji", and "Yamagata prefecture, Yonezawa city, Sasano" with block number information that is additional character string data stored in the block-number memory 33 like "9-8-7", "1-2", and "#1234", and apartment-condominium information that is combined depending on the setting whether or not to add the apartment-condominium information like "ABC condominium #302", "cooperative apartment ABC #101", and "Elysion Yonezawa #803".

Figure 7:
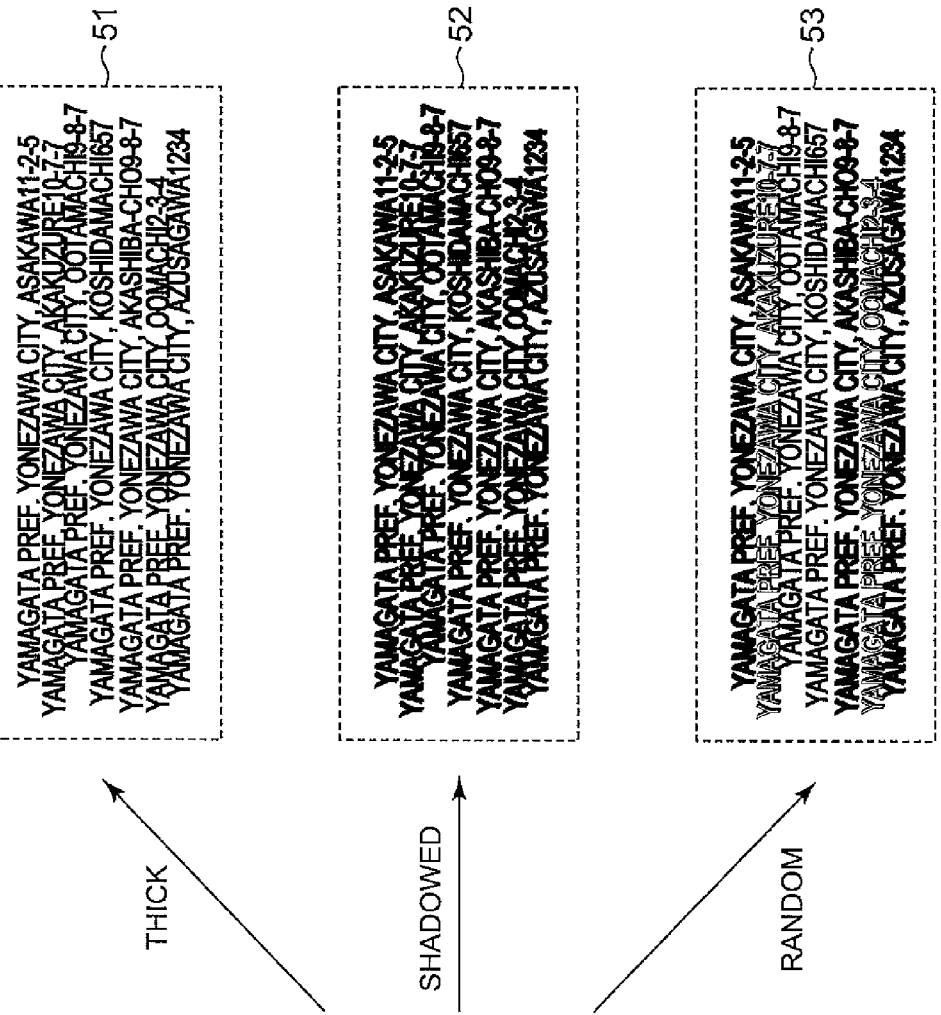
FIG. 7 is an explanatory diagram relating to concealing pattern data generated in order to conceal an address included in personal information by the scanning type printing device.
Figure 8:
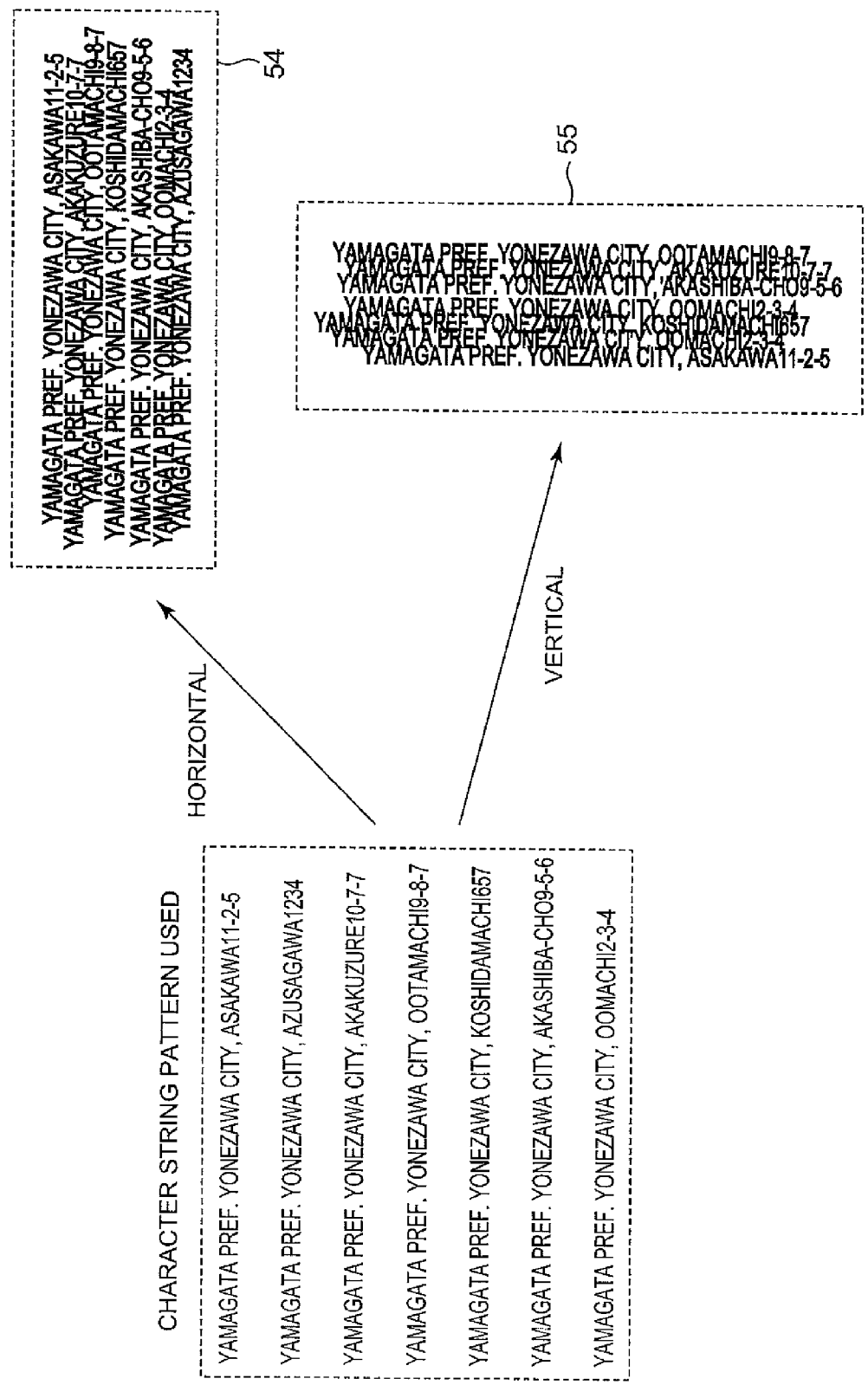
FIG. 8 is an explanatory diagram relating to concealing pattern data generated in order to conceal an address included in personal information by the scanning type printing device.

When the seven pieces of address data for concealing the address that is the personal information are generated, the control unit 10 functions as the concealing-pattern-data generating unit that executes a concealing-pattern-data generating process (step S170) of editing those pieces of address data which are character string data with the setting set through the option setting process (step S100), such as the character font kind, and the character style, and of combining pieces of the edited data so as to overlap one another, thereby generating concealing pattern data. FIGS. 7 and 8 show explanatory diagrams relating to concealing pattern data generated in order to conceal the address included in the personal information.

As shown in FIG. 7, when the character style setting in the various option settings set beforehand is a "thick character", the control unit 10 edits the plurality of generated address data like "Yamagata prefecture, Yonezawa city, Asakawa, 11-2-5", and "Yamagata prefecture, Yonezawa city, Azusa-gawa, 1234" in order to generate an illustrated concealing pattern 51 which can conceal the address in the personal information. Moreover, when the setting is a "shadowed character", the control unit 10 generates an illustrated concealing pattern 52 which can conceal the address in the personal information. Furthermore, when the setting is "random", the control unit 10 generates an illustrated concealing pattern 53 which can conceal the address in the personal information.

Moreover, as shown in FIG. 8, the control unit 10 extracts the printing direction from the character information obtained in the reading mode beforehand and when the extraction result is a "horizontal direction", generates an illustrated concealing pattern 54 which can conceal the address that is the personal information based on the plurality of generated address data like "Yamagata prefecture, Yonezawa city, Asakawa, 11-2-5", and "Yamagata prefecture, Yonezawa city, Azusa-gawa 1234". Moreover, when the extraction result is a "vertical direction", the control unit 10 generates an illustrated concealing pattern 55 which can conceal the address that is the personal information.

After the concealing pattern data is generated, the control unit 10 executes a printing-mode setting process (step S172) in order to shift the operation mode to the printing mode. As the printing-mode setting process (step S172), the control unit 10 displays a message like "set printing mode, set device to portion to be concealed and start printing" on the touch panel 4.

The control unit 10 sets printing data based on the generated concealing pattern data, and starts a printing process (step S175) after the user presses the operation switch 5. When the user moves the device main body placed on the printed object 40 while holding the operation switch 5, the control unit 10 controls the printing control unit 16 to drive the ink-jet head 6, prints the concealing pattern data on the printed object 40 line by line with a pulse signal generated by the rotary encoder 9 every time the device main body moves by a predetermined distance being as a timing signal, and terminates the process after the device main body is moved to a predetermined position.

Figure 9:
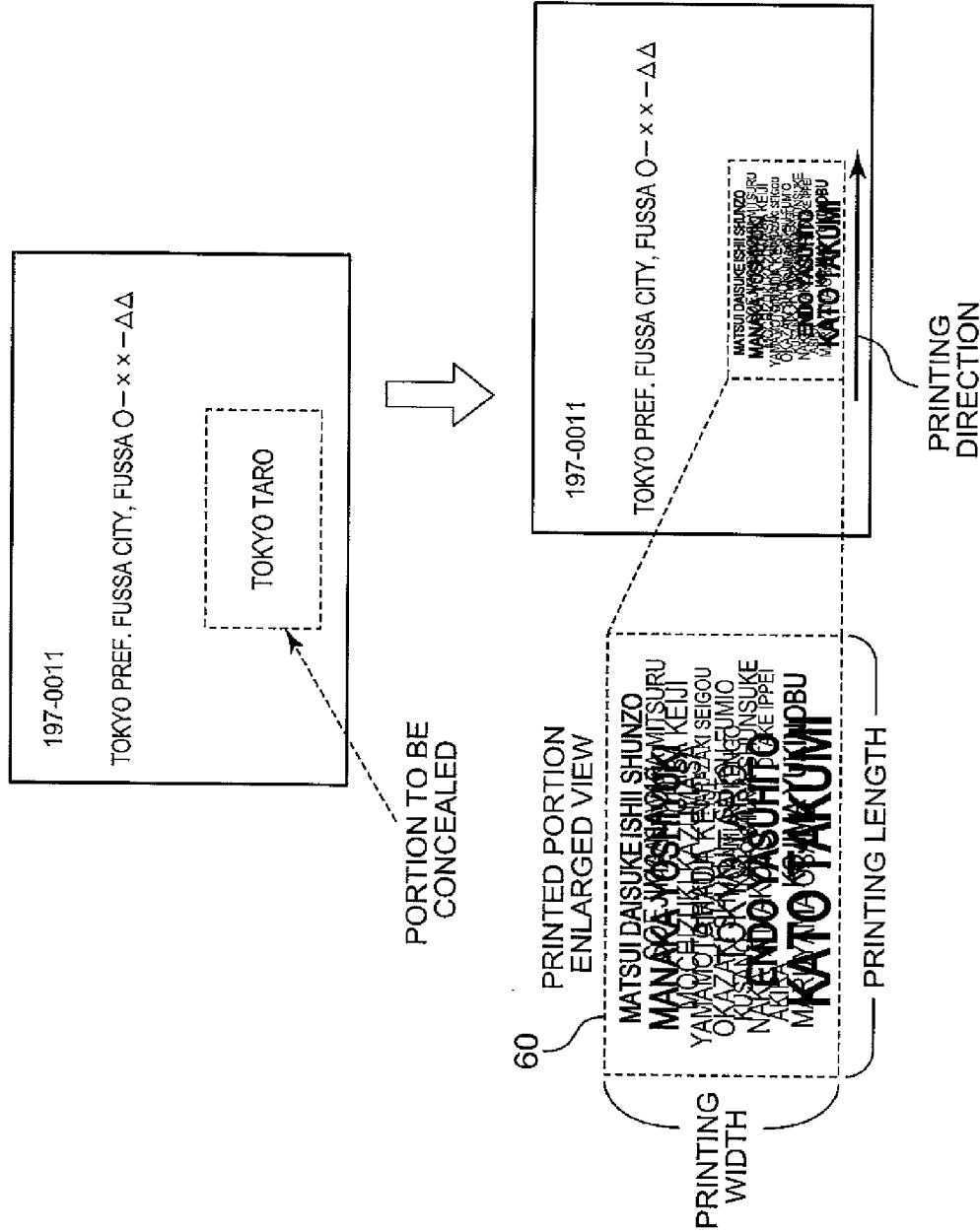
FIG. 9 is an explanatory diagram showing operations by the scanning type printing device up to an operation of concealing a personal name included in personal information.

Conversely, when determining in the item-kind determining process (step S125) that the item which is the kind of the personal information is a "personal name", the control unit 10 functions as the personal-name-data generating unit that generates a plurality of personal name data in order to generate concealing pattern data, and conceals the personal name that is the personal information. FIG. 9 is an explanatory diagram showing operations up to an operation of concealing the personal name included in the personal information.

As shown in FIG. 9, when determining that the kind of the personal information is a "personal name", and further detecting the printing width and printing length from the character information and when the character font kind in the various option settings of the security stamp set beforehand is "Gothic", the control unit 10 generates a predetermined concealing pattern 60, and executes the printing process.

Figure 10:
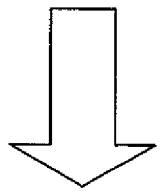
FIG. 10 is an explanatory diagram relating to personal-name-data generated in order to conceal a personal name included in personal information by the scanning type printing device.

The control unit 10 functions as the personal-name-data generating unit that reads a plurality of last-name data and a plurality of first-name data from the last-name data memory 31 which is the last-name data memory unit storing the plurality of last-name data and the first-name data memory 32 which is the first-name data memory unit storing the plurality of first-name data, respectively. Next, the control unit 10 executes a personal-name-data generating process (step S150) of combining the last-name data and the first-name data, and of generating a plurality of personal-name data to be printed. FIG. 10 is an explanatory diagram relating to personal-name-data generated in order to conceal the personal name included in the personal information.

As shown in FIG. 10, the last-name data memory 31 stores the plurality of last-name data like "SATO", "TAKAHASHI", "SUZUKI", and "WATANABE" beforehand. Moreover, the first-name data memory 32 stores the plurality of first-name data like "DAISUKE", "SHOUTA", "AI", and "AKINA" beforehand.

The control unit 10 functioning as the personal-name-data generating unit reads the plurality of last-name data and the plurality of first-name data from respective memories, and combines the last-name data and the first-name data, thereby generating a plurality of personal-name data like "SATO Daisuke" and "SUZUKI Shouta".

Furthermore, as the concealing-pattern-data generating unit, the control unit 10 executes the concealing-pattern-data generating process (step S170) of editing those personal name data based on the setting through the option setting process (step S100), combining those edited name data so that respective character strings overlap one another while changing the position thereof in a regular manner like at random or periodically, and of generating concealing pattern data. Next, the operation mode is set to be the printing mode (step S172), the printing process (step S175) is executed when the user starts the printing operation, and the process is terminated thereafter. FIG. 11 shows an explanatory diagram relating to concealing pattern data generated in order to conceal the personal name included in the personal information.

As shown in FIG. 11, the control unit 10 generates 20 pieces of personal name data like "TAKAHASHI Eita", "YAMAMOTO Ren", and "NAKAMURA Kenta". Next, when the setting of the character font kind in the various option settings set beforehand is "Gothic", the control unit 10 generates an illustrated concealing pattern 57 which can conceal the personal name that is the personal information. Moreover, when the character font kind is set to be a "MINCHO font", the control unit 10 generates an illustrated concealing pattern 58 which can conceal the personal name that is the personal information. Furthermore, when the character font kind is set to be a "random", the control unit 10 generates an illustrated concealing pattern 59 which can conceal the personal name that is the personal information.

When determining in the telephone-number determining process (step S120) that the item that is the kind of the personal information is a "telephone number", as the telephone-number-data generating unit, the control unit 10 executes a telephone-number-data generating process (step S155) which is the printing-data setting process of a plurality of telephone number data which is character string data to be printed and including a number string of arbitrary numbers at predetermined digits and synthesized with a hyphen or brackets surrounding numbers at a predetermined position.

After the plurality of telephone number data for concealing the telephone number that is the personal information are generated, as the concealing-pattern-data generating unit, the control unit 10 executes the concealing-pattern-data generating process (step S170) of editing those pieces of character string data based on the setting through the option setting process (step S100), combining those edited data so that respective character strings overlap one another while changing the position thereof in a regular manner like at random or periodically, and of generating concealing pattern data. Next, the operation mode is set to be the printing mode (step S172), the printing process (step S175) of the generated concealing pattern data is executed when the user starts the printing operation, and the process is terminated thereafter. FIG. 12 is an explanatory diagram showing operations up to an operation of concealing the telephone number included in the personal information.

As shown in FIG. 12, the control unit 10 determines that the kind of the personal information is a telephone number based on the character information included in the image read at the time of reading mode beforehand, extracts the printing width and the printing length from the character information, generates a predetermined concealing pattern 61, and prints such a pattern.

When determining in the item-kind determining process (step S125) that the item that is the kind of the personal information is an "e-mail address", the control unit 10 functions as an e-mail-address-data generating unit that executes an e-mail-address-data generating process (step S160) of synthesizing an arbitrary combination of characters with an at mark, and of synthesizing such a combination with character string data which is domain data like "docomo.ne.jp" and "ezweb.ne.jp" stored in the domain data memory 35, thereby generating a plurality of e-mail address data to be printed.

After generating the plurality of e-mail address data for concealing an e-mail address that is personal information, the control unit 10 functions as the concealing-pattern-data generating unit that executes the concealing-pattern-data generating process (step S170) of editing those pieces of character string data based on the setting through the option setting process (step S100), and combining those edited data so that respective character strings overlap one another while changing the position thereof in a regular manner like at random or periodically, thereby generating concealing pattern data. Next, the operation mode is set to be the printing mode (step S172), the printing process (step S175) of the generated concealing pattern data is executed when the user starts the printing operation, and the process is terminated thereafter.

As explained above, according to the present embodiment, in order to conceal the personal information on the printed object 40 like an address, a personal name or a telephone number, etc., the kind of the personal information on the printed object is automatically identified, a plurality of character strings corresponding to that kind are combined so as to overlap one another, thereby generating concealing pattern data. Moreover, the concealing pattern data can be changed as needed, so that the present invention provides the printing device that can conceal a character string included in the personal information in accordance with the sizes of various characters of the personal information and the contents of the personal information, the printing method that can conceal the character string included in the printed personal information, and the computer-readable recording medium recording the printing control program that allows the printing device to conceal a character string.

Moreover, according to the embodiment of the present invention, in order to conceal the personal information on the printed object 40 like an address, a personal name or a telephone number, etc., the kind of the personal information is automatically determined and the concealing pattern data in accordance with that kind is generated, so that identification of a personal name that is the personal information can be made difficult if a large number of personal names are printed in a concentrated manner.

Furthermore, according to the embodiment of the present invention, in order to conceal an address that is personal information on the printed object 40, a zip code corresponding to the address data is extracted, a plurality of address data of neighborhoods are generated when the change level is set to be a town and village level, and the plurality of address data are arranged and printed so as to overlap one another. This makes the address that is the personal information unspecifiable.

According to the embodiment of the present invention, in order to conceal a personal name that is the personal information on the printed object 40, a plurality of last-name data and a plurality of first-name data are stored in the last-name data memory 31 and in the first-name data memory 32 beforehand, respectively, those pieces of data are combined together in order to generate a plurality of personal name data, and the plurality of personal name data are arranged and printed so as to overlap one another. This makes the personal name that is the personal information unspecifiable.

According to the embodiment of the present invention, in order to conceal a telephone number that is the personal information on the printed object 40, a large number of telephone number data are generated and arranged and printed so as to overlap one another. This makes the telephone number that is the personal information to be concealed unspecifiable.

The processes in the embodiment of the present invention and shown by the flowcharts may be a program which can be realized by a computer and which is applied to various devices with such a program being written in a memory medium like a magneto disk, an optical disk, or a semiconductor memory or with such a program being transmitted through a communication medium. When respective processes explained in the embodiments of the present invention are stored in a desired memory medium as explained above, and a computer runs the program, the same effect as that of a case in which the device of the embodiment of the present invention is used can be obtained. The computer is not limited to the computer built in the device explained in the embodiment of the present invention, but includes all kinds of computers including an arithmetic device like a CPU which can read the program stored in the memory medium, and which can perform a control operation in accordance with the read program.

In the above-explained embodiment of the present invention, the explanation was given of a case in which the printing device is the scanning type printing device 1 that performs printing on the printed object 40 while being manually moved thereon. However, the present invention can be applied to a printing device that automatically performs scanning over the printed object 40 in order to perform printing.

The present invention is not limited to the above-explained embodiment, and can be changed and modified without departing from the scope and the spirit of the present invention.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A printing device that performs printing on a printed object where a character string indicating personal information, including an address, a personal name or a telephone number is printed in order to conceal the character string, the printing device comprising:
   a reading unit that reads the character string on the printed object and obtains image data when a device main body is moved;

a printing unit that performs printing when the device main body is moved;
an operation mode setting unit that sets an operation mode to either one of a reading mode that activates the reading unit when the device main body is moved or a printing mode that activates the printing unit when the device main body is moved;
a personal-information determining unit that determines a kind of the personal information that is an address, a personal name, or a telephone number based on the image data read by the reading unit when the operation mode is set to be the reading mode by the operation mode setting unit;
a printing data setting unit that inputs and sets, as character string data to be printed, a plurality of character strings belonging to a same kind of the personal information determined by the personal-information determining unit;
a concealing-pattern-data generating unit that generates concealing pattern data including the plurality of character strings input and set by the printing data setting unit as the character string data to be printed, the plurality of character strings being combined and arranged so as to overlap one another; and
a printing control unit that causes the printing unit to perform printing based on the concealing pattern data generated by the concealing-pattern-data generating unit when the operation mode is set to be the printing mode by the operation mode setting unit in order to print a concealing pattern on the character string printed on the printed object;
wherein the printing data setting unit includes:
a zip code dictionary that stores address data corresponding to zip code data beforehand; and
a data reading unit that reads, from the zip code dictionary, address data corresponding to each of a plurality of zip code data actually present and having a number of at least a part of digits of determined zip code data changed when the personal information determining unit determines that the kind of the personal information is an address.

2. The printing device according to claim 1, wherein:
the determined zip code data is zip code data corresponding to address data of the address indicated in the character string read by the reading unit,
the print data setting unit changes said at least a part of the digits of the determined zip code data in accordance with a change level setting so as to generate the plurality of zip code data which are actually present, and
the print data setting unit inputs and sets the character string data to be printed based on the address data read by the data reading unit corresponding to each of the plurality of generated zip code data which are actually present.

3. The printing device according to claim 2, wherein the print data setting unit (i) generates additional character string data including at least one of a block number, a building name, an apartment name, a floor number, and a room number, (ii) combines said additional character string data with the address data read by the data reading unit, and (iii) inputs and sets the combined additional character string data and address data as the character string data to be printed.

4. A printing device that performs printing on a printed object where a character string indicating personal information, including an address, a personal name or a telephone number is printed in order to conceal the character string, the printing device comprising:

a reading unit that reads the character string on the printed object and obtains image data when a device main body is moved;
a printing unit that performs printing when the device main body is moved;
an operation mode setting unit that sets an operation mode to either one of a reading mode that activates the reading unit when the device main body is moved or a printing mode that activates the printing unit when the device main body is moved;
a personal-information determining unit that determines a kind of the personal information that is an address, a personal name, or a telephone number based on the image data read by the reading unit when the operation mode is set to be the reading mode by the operation mode setting unit;
a printing data setting unit that inputs and sets, as character string data to be printed, a plurality of character strings belonging to a same kind of the personal information determined by the personal-information determining unit;
a concealing-pattern-data generating unit that generates concealing pattern data including the plurality of character strings input and set by the printing data setting unit as the character string data to be printed, the plurality of character strings being combined and arranged so as to overlap one another; and
a printing control unit that causes the printing unit to perform printing based on the concealing pattern data generated by the concealing-pattern-data generating unit when the operation mode is set to be the printing mode by the operation mode setting unit in order to print a concealing pattern on the character string printed on the printed object;
wherein the printing data setting unit includes:
a last-name data memory unit that stores a plurality of last-name data beforehand;
a first-name data memory unit that stores a plurality of first-name data beforehand; and
a personal-name-data generating unit which reads a plurality of last-name data and a plurality of first-name data from the last-name data memory unit and the first-name data memory unit, respectively, when the personal information determining unit determines that the kind of the personal information is a personal name, and combines the last-name data and the first-name data in order to generate a plurality of personal name data as the character string data.

5. A printing device that performs printing on a printed object where a character string indicating personal information, including an address, a personal name or a telephone number is printed in order to conceal the character string, the printing device comprising:
a reading unit that reads the character string on the printed object and obtains image data when a device main body is moved;
a printing unit that performs printing when the device main body is moved;
an operation mode setting unit that sets an operation mode to either one of a reading mode that activates the reading unit when the device main body is moved or a printing mode that activates the printing unit when the device main body is moved;
a personal-information determining unit that determines a kind of the personal information that is an address, a personal name, or a telephone number based on the image data read by the reading unit when the operation mode is set to be the reading mode by the operation mode setting unit;

a printing data setting unit that inputs and sets, as character string data to be printed, a plurality of character strings belonging to a same kind of the personal information determined by the personal-information determining unit;

a concealing-pattern-data generating unit that generates concealing pattern data including the plurality of character strings input and set by the printing data setting unit as the character string data to be printed, the plurality of character strings being combined and arranged so as to overlap one another; and a printing control unit that causes the printing unit to perform printing based on the concealing pattern data generated by the concealing-pattern-data generating unit when the operation mode is set to be the printing mode by the operation mode setting unit in order to print a concealing pattern on the character string printed on the printed object;

wherein the printing data setting unit includes a telephone-number-data generating unit that generates, as the character string data, a plurality of telephone number data including a number string with arbitrary numbers at predetermined digits and a separator which is a hyphen or brackets arranged at a predetermined position in the number string when the personal information determining unit determines that the kind of the personal information is a telephone number.

6. A printing method of performing printing on a printed object where a character string indicating personal information, including an address, a personal name or a telephone number, is printed in order to conceal the character string using a printing device that comprises a reading unit which reads the character string on the printed object and obtains image data when a device main body is moved in a reading mode, and a printing unit which performs printing when the device main body is moved in a printing mode, the printing method comprising:

determining a kind of the personal information that is an address, a personal name, or a telephone number based on the image data read by the reading unit in the reading mode;

inputting and setting, as character string data to be printed, a plurality of character strings belonging to a same kind of the personal information determined in the determining;

generating concealing pattern data including the plurality of character strings input and set as the character string data to be printed, the plurality of character strings being combined and arranged so as to overlap one another; and causing the printing unit to perform printing based on the generated concealing pattern data when the device main body is moved over the printed object in the printing mode in order to print a concealing pattern on the character string printed on the printed object;

wherein the inputting and setting the plurality of character strings as the character string data includes reading, from a zip code dictionary, address data stored therein beforehand and corresponding to each of a plurality of zip code data actually present and having a number of at least a part of digits of determined zip code data changed when it is determined that the kind of the personal information is an address.

7. The printing method according to claim 6, wherein:
the determined zip code data is zip code data corresponding to address data of the address indicated in the character string read by the reading unit,
said at least a part of the digits of the determined zip code data is changed in accordance with a change level setting so as to generate the plurality of zip code data which are actually present, and
the character string data to be printed is input and set based on the read address data corresponding to each of the plurality of generated zip code data which are actually present.

8. The printing method according to claim 7, wherein the inputting and setting further comprises
(i) generating additional character string data including at least one of a block number, a building name, an apartment name, a floor number, and a room number, (ii) combining said additional character string data with the read address data, and (iii) inputting and setting the combined additional character string data and address data as the character string data to be printed.

9. A printing method of performing printing on a printed object where a character string indicating personal information, including an address, a personal name or a telephone number, is printed in order to conceal the character string using a printing device that comprises a reading unit which reads the character string on the printed object and obtains image data when a device main body is moved in a reading mode, and a printing unit which performs printing when the device main body is moved in a printing mode, the printing method comprising:

determining a kind of the personal information that is an address, a personal name, or a telephone number based on the image data read by the reading unit in the reading mode;

inputting and setting, as character string data to be printed, a plurality of character strings belonging to a same kind of the personal information determined in the determining;

generating concealing pattern data including the plurality of character strings input and set as the character string data to be printed, the plurality of character strings being combined and arranged so as to overlap one another; and causing the printing unit to perform printing based on the generated concealing pattern data when the device main body is moved over the printed object in the printing mode in order to print a concealing pattern on the character string printed on the printed object;

wherein the inputting and setting the plurality of character strings as the character string data includes reading a plurality of last-name data and a plurality of first-name data from a last-name data memory unit that stores a plurality of last-name data beforehand and a first-name data memory unit that stores a plurality of first-name data beforehand, respectively, when it is determined that the kind of the personal information is a personal name, the last-name data memory unit and the first-name memory unit being provided in the printing device, and combining the last-name data and the first-name data in order to generate a plurality of personal name data as the character string data.

10. A printing method of performing printing on a printed object where a character string indicating personal information, including an address, a personal name or a telephone number, is printed in order to conceal the character string using a printing device that comprises a reading unit which reads the character string on the printed object and obtains image data when a device main body is moved in a reading mode, and a printing unit which performs printing when the device main body is moved in a printing mode, the printing method comprising:

- determining a kind of the personal information that is an address, a personal name, or a telephone number based on the image data read by the reading unit in the reading mode;
- inputting and setting, as character string data to be printed, a plurality of character strings belonging to a same kind of the personal information determined in the determining;
- generating concealing pattern data including the plurality of character strings input and set as the character string data to be printed, the plurality of character strings being combined and arranged so as to overlap one another; and
- causing the printing unit to perform printing based on the generated concealing pattern data when the device main body is moved over the printed object in the printing mode in order to print a concealing pattern on the character string printed on the printed object;
- wherein the inputting and setting the plurality of character strings as the character string data includes generating a plurality of telephone number data including a number string with arbitrary numbers at predetermined digits and a separator which is a hyphen or brackets arranged at a predetermined position in the number string when it is determined that the kind of the personal information is a telephone number.

11. A non-transitory computer-readable recording medium having stored thereon a printing control program that is executable by a computer to control a printing device that performs printing on a printed object where a character string indicating personal information, including an address, a personal name or a telephone number, is printed in order to conceal the character string, the printing device comprising a reading unit which reads the character string on the printed object and obtains image data when a device main body is moved in a reading mode, and a printing unit which performs printing when the device main body is moved in a printing mode, the printing control program being executable by the computer to perform processes comprising:

- determining a kind of the personal information that is an address, a personal name, or a telephone number, based on the image data read by the reading unit in the reading mode;
- inputting and setting, as character string data to be printed, a plurality of character strings belonging to a same kind of the personal information determined in the determining;
- generating concealing pattern data including the plurality of character strings input and set as the character string data to be printed, the plurality of character strings being combined and arranged so as to overlap one another; and
- causing the printing unit to perform printing based on the generated concealing pattern data when the device main body is moved over the printed object in the printing mode in order to print a concealing pattern on the character string printed on the printed object;
- wherein the inputting and setting comprises reading, from a zip code dictionary, address data stored therein beforehand and corresponding to each of a plurality of zip code data actually present and having a number of at least a part of digits of determined zip code data changed when it is determined that the kind of the personal information is an address.

12. The non-transitory computer-readable recording medium according to claim 11, wherein:

- the determined zip code data is zip code data corresponding to address data of the address indicated in the character string read by the reading unit,
- said at least a part of the digits of the determined zip code data is changed in accordance with a change level setting so as to generate the plurality of zip code data which are actually present, and
- the character string data to be printed is input and set based on the read address data corresponding to each of the plurality of generated zip code data which are actually present.

13. The non-transitory computer-readable recording medium according to claim 12, wherein the inputting and setting further comprises (i) generating additional character string data including at least one of a block number, a building name, an apartment name, a floor number, and a room number, (ii) combining said additional character string data with the read address data, and (iii) inputting and setting the combined additional character string data and address data as the character string data to be printed.

14. A non-transitory computer-readable recording medium having stored thereon a printing control program that is executable by a computer to control a printing device that performs printing on a printed object where a character string indicating personal information, including an address, a personal name or a telephone number, is printed in order to conceal the character string, the printing device comprising a reading unit which reads the character string on the printed object and obtains image data when a device main body is moved in a reading mode, and a printing unit which performs printing when the device main body is moved in a printing mode, the printing control program being executable by the computer to perform processes comprising:

- determining a kind of the personal information that is an address, a personal name, or a telephone number, based on the image data read by the reading unit in the reading mode;
- inputting and setting, as character string data to be printed, a plurality of character strings belonging to a same kind of the personal information determined in the determining;
- generating concealing pattern data including the plurality of character strings input and set as the character string data to be printed, the plurality of character strings being combined and arranged so as to overlap one another; and
- causing the printing unit to perform printing based on the generated concealing pattern data when the device main body is moved over the printed object in the printing mode in order to print a concealing pattern on the character string printed on the printed object;
- wherein the inputting and setting comprises reading a plurality of last-name data and a plurality of first-name data from a last-name data memory unit that stores a plurality of last-name data beforehand and a first-name data memory unit that stores a plurality of first-name data beforehand, respectively, when it is determined that the kind of the personal information is a personal name, the last-name data memory unit and the first-name memory unit being provided in the printing device, and combining the last-name data and the first-name data in order to generate a plurality of personal name data as the character string data.

15. A non-transitory computer-readable recording medium having stored thereon a printing control program that is executable by a computer to control a printing device that performs printing on a printed object where a character string indicating personal information, including an address, a personal name or a telephone number, is printed in order to conceal the character string, the printing device comprising a reading unit which reads the character string on the printed object and obtains image data when a device main body is moved in a reading mode, and a printing unit which performs printing when the device main body is moved in a printing mode, the printing control program being executable by the computer to perform processes comprising:

determining a kind of the personal information that is an address, a personal name, or a telephone number, based on the image data read by the reading unit in the reading mode;

inputting and setting, as character string data to be printed, a plurality of character strings belonging to a same kind of the personal information determined in the determining;

generating concealing pattern data including the plurality of character strings input and set as the character string data to be printed, the plurality of character strings being combined and arranged so as to overlap one another; and causing the printing unit to perform printing based on the generated concealing pattern data when the device main body is moved over the printed object in the printing mode in order to print a concealing pattern on the character string printed on the printed object;

wherein the inputting and setting comprises generating a plurality of telephone number data including a number string with arbitrary numbers at predetermined digits and a separator which is a hyphen or brackets arranged at a predetermined position in the number string when it is determined that the kind of the personal information is a telephone number.

\* \* \* \* \*